(12) United States Patent
Aissaoui et al.

(10) Patent No.: US 9,363,161 B2
(45) Date of Patent: *Jun. 7, 2016

(54) VIRTUAL CONNECTION ROUTE SELECTION APPARATUS AND TECHNIQUES

(71) Applicant: ALCATEL LUCENT, Paris (FR)

(72) Inventors: Mustapha Aissaoui, Kanata (CA); Andrew Dolganow, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,597

(22) Filed: Feb. 23, 2015

(65) Prior Publication Data
US 2015/0172166 A1  Jun. 18, 2015

Related U.S. Application Data

(63) Continuation of application No. 13/684,677, filed on Nov. 26, 2012, now abandoned, which is a continuation of application No. 11/679,582, filed on Feb. 27, 2007, now Pat. No. 8,345,552.

(51) Int. Cl.
*H04L 12/727* (2013.01)
*H04L 12/721* (2013.01)
*H04L 12/66* (2006.01)
(Continued)

(52) U.S. Cl.
CPC .............. *H04L 45/121* (2013.01); *H04L 12/66* (2013.01); *H04L 45/02* (2013.01); *H04L 45/04* (2013.01); *H04L 45/12* (2013.01); *H04L 45/124* (2013.01); *H04L 45/44* (2013.01); *H04L 45/50* (2013.01); *H04L 47/10* (2013.01)

(58) Field of Classification Search
None
See application file for complete search history.

(56) References Cited

U.S. PATENT DOCUMENTS

| 4,991,204 A | 2/1991 | Yamamoto et al. |
| 5,991,204 A | 11/1999 | Chang |

(Continued)

FOREIGN PATENT DOCUMENTS

EP  1 580 940 A1  9/2005

OTHER PUBLICATIONS

Farrel, et al., "A Path Computation Element (PCE)-Based Architecture", Request for Comments (RFC)-4655, The Internet Society, Aug. 2006, 36 pp.

(Continued)

*Primary Examiner* — Vincelas Louis
(74) *Attorney, Agent, or Firm* — Kramer & Amado, P.C.

(57) ABSTRACT

Virtual connection route selection apparatus and techniques are disclosed. At a communication traffic routing apparatus, metric information associated with multiple different routes for a virtual connection, such as a PseudoWire, toward a destination is collected. The metric information may be collected from one or more remote route computation elements capable of computing routes for virtual connections between the routing apparatus and other routing apparatus over an underlying communication system, or during actual establishment of the virtual connections, for example. An initial or re-optimized route for a virtual connection can then be selected at the routing apparatus based on the collected metric information. In some embodiments, although the virtual connection routes are paths computed by Path Computation Elements (PCEs), actual path selection decisions are distributed to routers.

13 Claims, 5 Drawing Sheets

(51) Int. Cl.
*H04L 12/751* (2013.01)
*H04L 12/715* (2013.01)
*H04L 12/723* (2013.01)
*H04L 12/801* (2013.01)

(56) References Cited

U.S. PATENT DOCUMENTS

| | | | |
|---|---|---|---|
| 6,377,551 | B1 | 4/2002 | Luo et al. |
| 6,687,228 | B1 | 2/2004 | Fichou et al. |
| 6,697,334 | B1 | 2/2004 | Klincewicz et al. |
| 7,275,103 | B1 | 9/2007 | Thrasher et al. |
| 7,522,603 | B2 | 4/2009 | Vasseur |
| 8,788,640 | B1 | 7/2014 | Masters |
| 2003/0118027 | A1 | 6/2003 | Lee et al. |
| 2004/0042396 | A1 | 3/2004 | Brown et al. |
| 2006/0013226 | A1 | 1/2006 | Ervin et al. |
| 2006/0029033 | A1 | 2/2006 | Lee |
| 2006/0039391 | A1 | 2/2006 | Vasseur et al. |
| 2006/0072543 | A1 | 4/2006 | Lloyd et al. |
| 2006/0101142 | A1 | 5/2006 | Vasseur et al. |
| 2006/0104297 | A1 | 5/2006 | Buyukkoc et al. |
| 2006/0126502 | A1 | 6/2006 | Vasseur et al. |
| 2006/0133282 | A1 | 6/2006 | Ramasamy |
| 2006/0140119 | A1 | 6/2006 | Yeh et al. |
| 2006/0171320 | A1 | 8/2006 | Vasseur et al. |
| 2006/0176820 | A1 | 8/2006 | Vasseur et al. |
| 2006/0198308 | A1 | 9/2006 | Vasseur et al. |
| 2006/0200579 | A1 | 9/2006 | Vasseur et al. |
| 2006/0209682 | A1 | 9/2006 | Filsfils et al. |
| 2007/0047469 | A1 | 3/2007 | Vasseur et al. |
| 2007/0121510 | A1 | 5/2007 | Chekuri et al. |
| 2007/0160061 | A1 | 7/2007 | Vasseur et al. |
| 2007/0280117 | A1* | 12/2007 | Katz ................. H04L 12/24 370/238 |
| 2008/0049622 | A1 | 2/2008 | Previdi et al. |
| 2008/0080473 | A1* | 4/2008 | Thubert ............ G06F 13/4045 370/348 |
| 2008/0089227 | A1* | 4/2008 | Guichard ................ H04L 1/22 370/228 |
| 2008/0091809 | A1 | 4/2008 | Lee |
| 2010/0046527 | A1 | 2/2010 | Li et al. |
| 2012/0155329 | A1 | 6/2012 | Shaffer et al. |

OTHER PUBLICATIONS

Vasseur, et al., "Path Computation Element (PCE) communication Protocol (PCEP)", Internet-Draft, The IETF Trust, Feb. 13, 2007, 60 pp.

Dolganow, et al., "A new object to specify a Traffic Engineering (TE) Label Switch Path (LSP) cost", Internet-Draft, The Internet Society, Oct. 2005, 11 pp.

The ATM Forum, "Domain-based rerouting for active point-to-point calls—version 1.0", af-cs-0173-000, Aug. 2001; 202 pp.; see pp. 13, 19 to 40, 52 to 66, 94 to 102.

European Patent Office, "International Search Report and Written Opinion", Oct. 21, 2008, 13 pp.

United States Patent and Trademark Office, U.S. Non-final Office Action for U.S. Appl. No. 11/679,582, Sep. 30, 2009, 24 pages.

United States Patent and Trademark Office, U.S. Final Office Action for U.S. Appl. No. 11/679,582, Apr. 5, 2010, 25 pages.

United States Patent and Trademark Office, U.S. Non-final Office Action for U.S. Appl. No. 11/679,582, Aug. 19, 2010, 48 pages.

United States Patent and Trademark Office, U.S. Final Office Action for U.S. Appl. No. 11/679,582, Mar. 17, 2011, 67 pages.

United States Patent and Trademark Office, U.S. Non-final Office Action for U.S. Appl. No. 11/679,582, Jan. 4, 2012, 51 pages.

United States Patent and Trademark Office, U.S. Final Office Action for U.S. Appl. No. 11/679,582, Jun. 11, 2012, 31 pages.

United States Patent and Trademark Office, U.S. Notice of Allowance and Fee(s) Due and Notice of Allowability issued for U.S. Appl. No. 11/679,582, Aug. 24, 2012, 9 pp.

United States Patent and Trademark Office, U.S. Non-Final Office Action for U.S. Appl. No. 13/684,677, May 9, 2013, 36 pages.

United States Patent and Trademark Office, U.S. Final Office Action for U.S. Appl. No. 13/684,677, Jan. 6, 2014, 37 pages.

United States Patent and Trademark Office, U.S. Non-Final Office Action for U.S. Appl. No. 13/684,677, Oct. 23, 2014, 34 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       Length (bytes)          |   Class-Num   |    C-Type     |
+-+-+-+-+-+-+-+-+-+-+-+-+-+-+-+-+-+-+-+-+-+-+-+-+-+-+-+-+-+-+-+-+
|                                                               |
.                       Cost object body                        .
|                                                               |
+-+-+-+-+-+-+-+-+-+-+-+-+-+-+-+-+-+-+-+-+-+-+-+-+-+-+-+-+-+-+-+-+
```

FIG. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Object-Class  |   OT  |Res|P|I|     Object Length (bytes)     |
+-+-+-+-+-+-+-+-+-+-+-+-+-+-+-+-+-+-+-+-+-+-+-+-+-+-+-+-+-+-+-+-+
|                                                               |
.                         (object body)                         .
|                                                               |
+-+-+-+-+-+-+-+-+-+-+-+-+-+-+-+-+-+-+-+-+-+-+-+-+-+-+-+-+-+-+-+-+
```

FIG. 7

VIRTUAL CONNECTION ROUTE SELECTION APPARATUS AND TECHNIQUES

CROSS-REFERENCE TO RELATED APPLICATIONS

This application is a continuation of U.S. patent application Ser. No. 13/684,677 filed on Nov. 26, 2012, which is a continuation of U.S. patent application Ser. No. 11/679,582 filed on Feb. 27, 2007, now U.S. Pat. No. 8,345,552.

The entire contents of the related patent applications are incorporated in their entirety herein by reference.

FIELD OF THE INVENTION

This invention relates generally to communications and, in particular, to selecting between routes for virtual connections over an underlying communication system.

BACKGROUND

There are many circumstances in which a head end or source router cannot accurately determine the end-to-end cost and/or possibly other metrics associated with a path that is used to establish an end-to-end PseudoWire (PW). This is especially true for Multi-Segment PWs (MS-PWs) or for PWs spanning multiple operational or administrative domains such as routing domains. Although a head-end router might attempt to find the best path based on its local information, there is no guarantee that the established path is optimal with respect to the above mentioned metrics. There are currently no mechanisms for re-optimizing virtual connections such as end-to-end PWs based on the total end-to-end cost discovered.

In Asynchronous Transfer Mode (ATM) systems, a Domain Based Rerouting feature together with other signalling capabilities of Private Network-Network Interface (PNNI) specifications has been used to collect a total cost of a head-end routed connection, to establish alternative connections, and then to move one connection into another, potentially optimizing the end-to-end cost. This particular feature, however, is currently limited to ATM, and is also not applicable to communication systems in which centralized path computation is deployed, for example.

In Internet Protocol (IP) networks, external systems are typically required to re-optimize paths. However, these external systems likely have a limitation of working within a single administrative boundary only, as security concerns tend to prevent network operators from sharing their network topology information so as to allow effective end-to-end optimization.

Thus, there remains a need for improved techniques relating to optimization of, and more generally selection between multiple available paths or routes for, virtual connections such as PWs.

SUMMARY OF THE INVENTION

Some embodiments of the invention provide a mechanism to dynamically optimize PWs based on collected metrics such as end-to-end cost.

According to one aspect of the invention, a communication traffic routing apparatus includes a metric information collector operable to collect, from metric information generated by at least one remote route computation element that is capable of computing routes for virtual connections between the routing apparatus and other routing apparatus over an underlying communication system, metric information associated with a plurality of different computed routes for a virtual connection toward a destination, and a selection module operatively coupled to the metric information collector and operable to select, from the different computed routes, based on the collected metric information, a route for a virtual connection toward the destination.

The routing apparatus may also include an interface operatively coupled to the metric information collector and operable to enable the routing apparatus to communicate with the at least one remote route computation element, in which case the metric information collector may collect metric information by receiving the metric information from the at least one remote route computation element through the interface.

The metric information collector may also receive through the interface, from any of the at least one remote route computation element, information indicative of each of the different computed routes.

Each remote route computation element may be a Path Computation Element (PCE) for computing Label Switched Paths (LSPs) in some embodiments. The metric information collector may then include a Path Computation Client (PCC).

The selection module may be operable to select a route for a virtual connection for initially establishing communication traffic transfer between the routing apparatus and the destination.

In some embodiments, the different computed routes include a currently selected route for a virtual connection that has been established toward the destination, and the selection module is operable to select either the currently selected route or another one of the different computed routes for a virtual connection for subsequently exchanging communication traffic with the destination, based on the collected metric information respectively associated with the different computed routes.

The virtual connections may be PWs, for instance.

In some embodiments, at least one of the virtual connections comprises a multi-segment virtual connection having a plurality of segments.

The metric information associated with each computed route of the plurality of different computed routes may include information indicative of at least one of: a route cost, cumulative delay to reach the destination from the routing apparatus over each computed route, and an amount of available bandwidth on each computed route after establishing the virtual connection over the computed route.

A method is also provided, and involves collecting at a routing apparatus, from metric information generated by at least one remote route computation element that is capable of computing routes for virtual connections between the routing apparatus and other routing apparatus over an underlying communication system, metric information associated with a plurality of different computed routes for a virtual connection toward a destination, and selecting at the routing apparatus, from the different computed routes, based on the collected metric information, a route for a virtual connection toward the destination.

The operation of collecting may involve receiving the metric information from the at least one remote route computation element.

As noted above, each remote route computation element may be a PCE for computing LSPs. In this case, receiving may involve receiving the metric information at a PCC of the routing apparatus.

In some embodiments, selecting involves selecting a route for a virtual connection for initially establishing communication traffic transfer between the routing apparatus and the destination.

Where the different computed routes comprise a currently selected route for a virtual connection that has been established toward the destination, selecting may involve selecting either the currently selected route or another one of the different computed routes for subsequently exchanging communication traffic with the destination, based on the collected metric information respectively associated with the different computed routes.

The metric information used in such a method may include information indicative of at least one of: a route cost, cumulative delay to reach the destination from the routing apparatus over each computed route, and an amount of available bandwidth on each computed route after establishing the virtual connection over the computed route.

A method may be implemented, for example, in the form of instructions stored on a computer-readable medium.

A communication traffic routing apparatus according to another aspect of the invention includes a metric information collector operable to collect metric information respectively associated with a plurality of different routes over which PWs for exchanging communication traffic between the routing apparatus and a destination can be established, the different PW routes comprising a currently selected PW route for a PW that has been established toward the destination, and a selection module operatively coupled to the metric information collector and operable to select either the currently selected PW route or another one of the different PW routes for a PW for subsequently exchanging communication traffic with the destination, the selection module selecting a PW route for a PW for subsequently exchanging communication traffic with the destination based on the metric information respectively associated with the plurality of different PW routes.

The routing apparatus may also include an interface operatively coupled to the metric information collector and operable to enable the metric information collector to communicate with a remote route computation element, the remote route computation element being capable of computing a PW route of the plurality of different PW routes, in which case the metric information collector may be operable to collect metric information by receiving through the interface, from the remote route computation element, metric information associated with the PW route that the remote route computation element is capable of computing.

In some embodiments, the routing apparatus also includes a routing module operatively coupled to the metric information collector and operable to cause any of the PWs to be established. The metric information collector may then be further operable to collect metric information associated with a PW route of each of the PWs during establishment of the PWs. The routing module may be further operable to cause each established PW having a PW route other than the PW route selected by the selection module for subsequently exchanging communication traffic with the destination to be released.

In a case where each of the PWs is established through control signalling, the metric information collector may be operable to collect, from the control signalling, the metric information associated with the PW route of each of the PWs.

A further aspect of the invention provides a method that involves collecting at a routing apparatus metric information respectively associated with a plurality of different routes over which PWs for exchanging communication traffic between the routing apparatus and a destination can be established, the different PW routes comprising a currently selected PW route for a PW that has been established toward the destination, and selecting at the routing apparatus either the currently selected PW route or another one of the different PW routes for a PW for subsequently exchanging communication traffic with the destination, based on the metric information respectively associated with the plurality of different PW routes.

Collecting may involve receiving, from a remote route computation element that is capable of computing a PW route of the plurality of different PW routes, metric information associated with the PW route.

The method may also include exchanging control signalling with other routing apparatus to establish at least one PW having a PW route other than the currently selected PW route, in which case collecting may involve collecting, from the control signalling, metric information associated with the PW route of each of the at least one of the PWs.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

FIG. 6 is a block diagram of an example data structure for carrying metric information in control signalling.

FIG. 7 is a block diagram of another example data structure for transferring metric information to routing apparatus.

DETAILED DESCRIPTION OF PREFERRED EMBODIMENTS

The description below refers to the following documents or the technologies disclosed therein:

Farrel, et al., "A Path Computation Element (PCE)-Based Architecture", Request For Comments (RFC)-4655, The Internet Society, August 2006;

Vasseur, et al., "Path Computation Element (PCE) communication Protocol (PCEP)", Internet-Draft, The IETF Trust, Feb. 13, 2007;

Dolganow, et al., "A new object to specify a Traffic Engineering (TE) Label Switch Path (LSP) cost", Internet-Draft, The Internet Society, October 2005.

Figure 1:
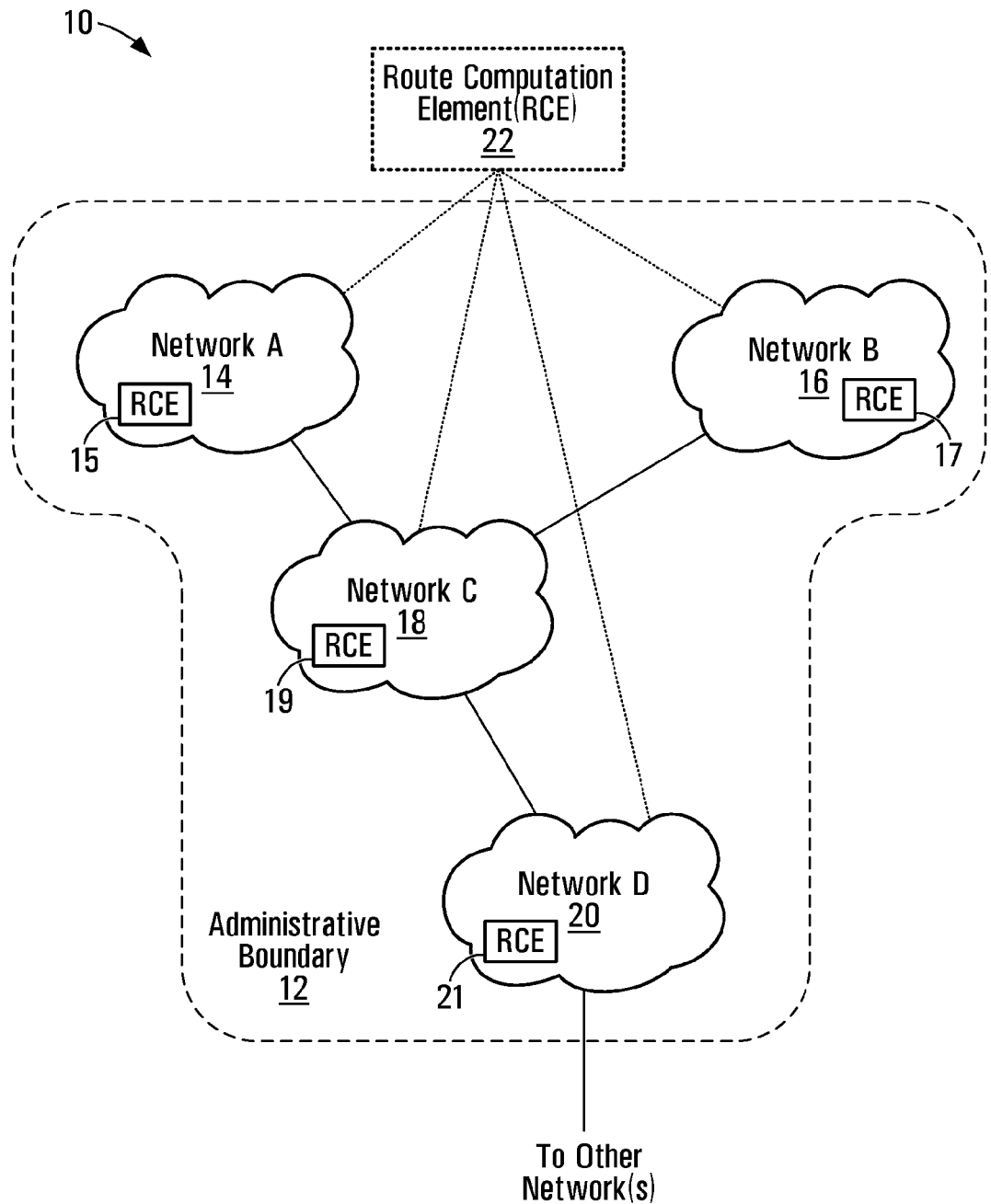
FIG. 1 is a block diagram of a communication system.

FIG. 1 is a block diagram of a communication system in which embodiments of the invention may be implemented. The communication system 10 includes several networks 14, 16, 18, 20, which may in some embodiments be different operational and/or administrative sub-domains within an administrative boundary 12. For example, the networks 14, 16, could be metro networks, the network 18 could be an access network, and the network 20 could be a core network. Each of the networks 14, 16, 18, 20 includes a route computation element 15, 17, 19, 21 in the example shown. Within an administrative boundary 12, a single route computation element 22 might instead be used.

It should be appreciated that the system of FIG. 1, as well as the contents of the other drawings, are intended solely for illustrative purposes, and that the present invention is in no way limited to the particular example embodiments explicitly shown in the drawings and described herein.

For example, each of the networks 14, 16, 18, 20 could itself be a domain with separate administrative and/or operational boundaries. These may be brought together with other domains or managed separately at the single AS level in an arrangement as shown in FIG. 1. A centralized route computation element 22, distributed route computation elements 15, 17, 19, 21, or some combination thereof, might be feasible in this kind of arrangement. However, the present invention is in no way limited to embodiments in which networks, or more generally routing apparatus between which virtual connections can be established, are deployed within a single administrative boundary. This type of arrangement is shown in FIG. 1 solely to illustrate the possibility of centralized and distributed route computation elements.

It should also be appreciated that distributed route computation elements such as 15, 17, 19, 21 need not necessarily be network-specific. Other types of routing domains than distinct networks, such as different Interior Gateway Protocol (IGP) areas, different administratively established sub-domains, or different ASs for instance, are also contemplated. Each routing domain might have one or more route computation elements that can compute internal routes. The same route computation elements, or possibly one or more different route computation elements, might be operative to compute routes through and between multiple domains.

References herein to route computation elements should be interpreted accordingly.

Communication links within and between the networks 14, 16, 18, 20 may be established through any of various techniques. Typically, communication links within each network 14, 16, 18, 20 can be created statically or dynamically, whereas links between those networks are often statically configured by an operator using an NMS or some other terminal. Virtual connections might be established between routing apparatus in the networks 14, 16, 18, 20, over any of various routes using those underlying communication links. A virtual connection such as a PW, for example, might be established to allow certain kinds of services to be provided over connectionless communication networks. A virtual connection behaves substantially as a direct physical connection from the perspective of its endpoints, which can be important for some types of communication traffic transfers.

The route computation elements 15, 17, 19, 21, 22 compute routes for such virtual connections. In general, a route computation element will have some realm within which it can compute optimal routes. The route computation element 15 might be able to compute optimal routes within the network 14, for instance, whereas the route computation element 22 might be able to compute optimal routes between, and possibly also within, the networks 14, 16, 18, 20 in the administrative boundary 12.

In some implementations, multiple route computation elements may collaborate to compute optimal routes that span multiple routing domains. When a virtual connection is to be established between a source routing apparatus in the network 14 and a destination in the network 16 through the network 18, for instance, the source routing apparatus might forward a route computation request to the route computation element 15. Responsive to the request, the route computation element 15 itself computes a route for a segment of the virtual connection from the routing apparatus to a border routing apparatus in the network 14, but relies on the route computation elements 17, 19, to compute route segments through the networks 16, 18. Route computation by the route computation elements 17, 19 might be requested by the source routing apparatus or by the route computation element 15. A computed route is returned to the source routing apparatus, and the virtual connection can be initiated by the source routing apparatus along the computed route.

Those skilled in the art will be familiar with such route computation elements as Path Computation Elements (PCEs), which are used to compute Label Switched Paths (LSPs) for PWs, responsive to requests from Path Computation Clients (PCCs). A communication protocol that enables interaction between PCEs and Path Computation Clients (PCCs), and between PCEs for the purpose of multi-domain path computation, has been proposed in the above-referenced PCEP Internet-Draft document. Thus, a PCE is an example of a route computation element, and accordingly a path computed by a PCE is an example of a route.

The present invention is in no way limited to any particular types of route or path computation algorithms or elements, or to any specific communication systems or arrangements, and accordingly the communication system 10 has been described briefly herein. Illustrative examples of communication systems and their operation are described in further detail below to the extent necessary to illustrate embodiments of the invention.

Figure 2:
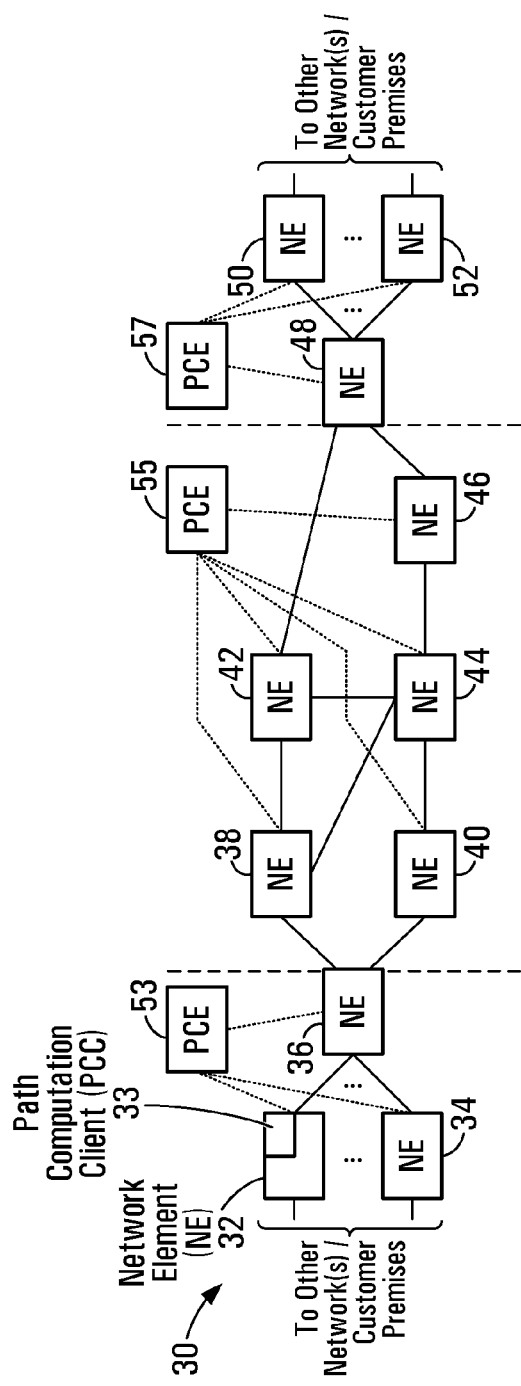
FIG. 2 is a block diagram of a collection of network elements in a communication system.

FIG. 2 is a block diagram of a collection of network elements (NEs) 32, 34, 36, 38, 40, 42, 44, 46, 48, 50, 52 in multiple routing domains of a communication system 30. The routing domains are delineated in FIG. 2 by dashed lines, and a distributed PCE 53, 55, 57 is shown as an example of a route computation element for each domain. A PCE 53, 55, 57 may communicate with any, and possibly all, NEs in its respective routing domain through an NE-based PCC. Although only one PCC 33 has been shown in FIG. 2 to avoid overly complicating the drawing, a PCC may be provided at each NE in the system 30. PCEs may also communicate with each other and/or possibly with NEs in other routing domains. This inter-domain interaction enables a PCE in one routing domain to accept and respond to path computation requests from PCEs or NEs in other routing domains when routes for virtual connections that span multiple routing domains are to be computed, for instance.

Other components may be provided in a communication system, such as components to support administrative, control, and management functions, for example, but have not been explicitly shown in FIG. 2, again to avoid overly complicating the drawing.

The domain that includes the NEs 32, 34, 36 and the domain that includes the NEs 48, 50, 52 might be metro networks, and the other domain might be an access network, for example. In this case, one or more of the NEs 38, 40, 42, 44, 46 may also be connected to NEs in a core network and/or other network (not shown). As noted above, however, other types of routing domains are also possible. Those domains may be defined in terms of different IGP areas or at a higher protocol level, as PW domains, for example. The dashed lines shown in FIG. 2 should therefore not be interpreted as indicating that domains must be defined by some sort of physical layer arrangement.

Interconnections between the NEs shown in FIG. 2 may include wired, wireless, or both wired and wireless communication links. The present invention is not restricted to any particular types of communication links between NEs, or to any particular protocols or transfer mechanisms. Embodiments of the invention might be particularly useful to establish PWs to support higher-level services over connectionless networks such as packet switched networks (PSNs), although the techniques disclosed herein may be used in conjunction with any of various underlying communication links, such as MultiProtocol Label Switching (MPLS) tunnels in an IP network, for example.

The NEs 32, 34, 36, 38, 40, 42, 44, 46, 48, 50, 52 shown in FIG. 2 are routers in one embodiment. Routers, especially in implementations such as access and metro networks where large numbers of NEs are to be deployed at as low a cost as possible, may employ only limited routing functionality to reduce cost and complexity. Communication links between routers may be established statically or dynamically, independently by the routers or under control of a management/control system such as an NMS.

PWs and other types of virtual connections may also be established, between NEs such as routers, over underlying communication links. The underlying communication links include at least physical layer links, and may also themselves include other logical communication links. In one embodiment, the techniques disclosed herein are applied to PWs over underlying MPLS tunnels in an IP network. Although a virtual connection such as a PW behaves substantially as a fixed path from the point of view of its endpoints, the actual transport path in an underlying communication system over which virtual connection traffic is transferred is not necessarily fixed. A PW between endpoint routers, for example, might be established over a connectionless network, in which case the actual transport path would not be fixed. References herein to virtual connections should be interpreted accordingly.

Figure 3:
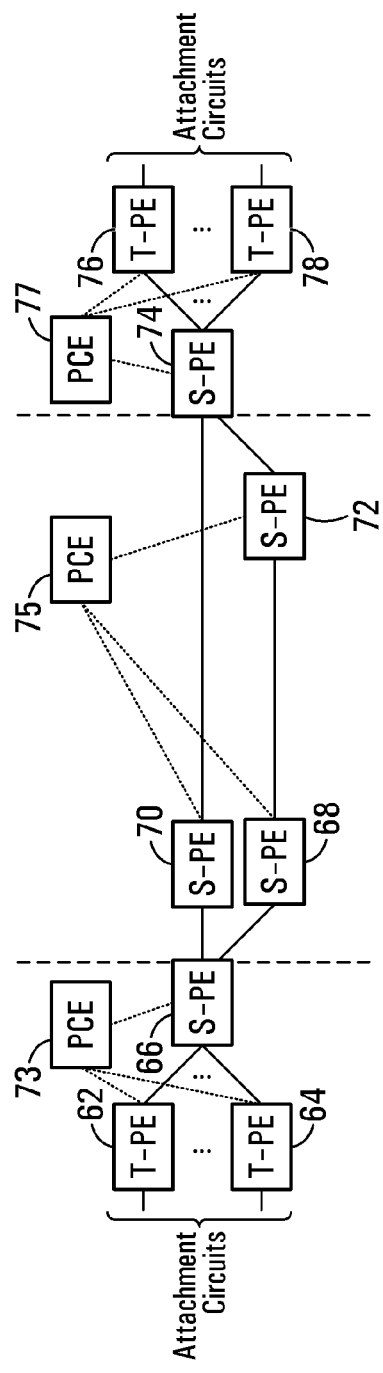
FIG. 3 is a block diagram of a logical communication link topology overlay on the network elements of FIG. 2.

FIG. 3 shows a logical communication link topology overlay on the network elements of FIG. 2. The logical topology 60 includes Provider Edge routers (PEs) 62, 64, 66, 68, 70, 72, 74, 76, 78. Each logical communication link represents, in one embodiment, a Targeted Label Distribution Protocol (T-LDP) session established between PEs for PW signalling within each administrative/operational sub-domain and between the sub-domains. The routers 62, 64, 76, 78 are Terminating PE routers (T-PEs) having associated attachments circuits for establishing MS-PWs for connections to other equipment that is not part of the logical topology, such as customer premises equipment, an NE that is not capable of participating in the logical topology, equipment in another communication network, etc. The routers 66, 68, 70, 72, 74 are Switching PE routers (S-PEs), which are capable of switching communication traffic between PW segments of an MS-PW. Although not explicitly shown in FIG. 3, multiple routers may exist on a logical communication link between two T-PE's, two S-PEs, or a T-PE and S-PE.

PCEs 73, 75, 77 are also shown, and, as indicated by the dashed connections, can communicate with the PEs 62, 64, 66, 68, 70, 72, 74, 76, 78, illustratively with PE-based PCCs. The PCEs 73, 75, 77 may also communicate with each other and/or with PEs outside their respective routing domains for multi-domain route computation.

PE routers are shown in FIG. 3 as a representative example of a type of routing apparatus that might be used to implement the techniques disclosed herein. PCEs are also intended as an illustrative example of a type of route computation element. These examples are not in any way intended to limit the scope of the present invention. For instance, although PE routers and PCEs are associated with particular communication protocols and particular types of virtual connections, embodiments of the invention are not limited to such protocols or virtual connections. Those skilled in the art will be familiar with PE routers and PCEs, their operation, and the associated protocols and virtual connections, and accordingly embodiments of the invention can be effectively illustrated in the context of PE routers and PCEs. Based on the illustrative example of PE routers and PCEs, those skilled in the art will be enabled to implement techniques disclosed herein in conjunction with other types of routing apparatus, protocols, and virtual connections.

It will be apparent from a comparison of FIGS. 2 and 3 that not all routers in a communication system need necessarily be capable of participating in communications at the logical overlay level. Multiple routers may exist on logical communication links between two T-PEs, two S-PEs, or a T-PE and S-PE. An NE that is not itself logical link-capable may thus be involved in transporting logical link control signalling and traffic between logical link-capable NEs, but may only participate in a limited scope of logical link functions or not participate at all in logical link functions such as actual processing of logical link signalling or traffic. Considering the logical link between the S-PEs 68, 72, for example, the NEs 40, 44, and 46 may all be involved in transporting logical link signalling and traffic. The NE 44 is not an S-PE, but might be a so-called intermediate P router in this example. Thus, although dashed connections are shown in FIG. 2 between the PCE 53, 55, 57 and every NE in each routing domain, a PCE might not actually communicate with every NE in its domain.

More generally, a logical topology might not exactly reflect the topology of an underlying communication system. Suppose that the NEs 42, 44 are also operatively coupled to other NEs (not shown). In this case, those other NEs will not be reachable through the logical topology 60, since the NEs 42, 44 are not part of the logical topology. Those other NEs may, however, participate in forwarding of MS-PW traffic or forwarding of signalling/control traffic exchanged over logical communication links.

The logical communication links shown in FIG. 3 can be used to establish virtual connections for carrying communication traffic between PEs. In an MPLS network, for example, a pair of PEs will establish a logical communication link in the form of a T-LDP session to exchange PW labels and thereby establish a PW over one or more underlying MPLS tunnels between the PEs.

Although illustrative embodiments of the invention described in detail herein relate primarily to selecting routes for virtual connections in the form of point-to-point (P2P), bi-directional MS-PWs, the present invention is not limited to P2P MS-PWs. It will be apparent to those skilled in art that other types of MS-PWs like point-to-multipoint, multipoint-to-point, multipoint-to-multipoint, and both uni- and bi-directional may be established using the techniques disclosed herein. Accordingly, references to virtual connections, and to PWs in particular, should be interpreted to encompass at least these types of PWs.

References to destinations and virtual connections toward destinations should also be interpreted in a non-limiting manner. A destination is intended to convey the notion of a far-end component with which communication traffic is to be exchanged over a virtual connection, and is not intended to connote a direction of traffic flow on a virtual connection. It should be noted that a destination may or may not be the endpoint of a virtual connection. For example, in the case of an AC of a router as a destination, the router itself may be the endpoint of a PW, whereas the AC is the destination with which communication traffic is to be exchanged using the PW.

A virtual connection toward a destination is intended to generally describe a virtual connection that forms at least part of a virtual connection between a routing apparatus and a virtual connection endpoint that is associated with the destination. In the example of an MS-PW, any segment of the MS-PW may be considered a virtual connection toward the destination. Again, no connotation of direction of traffic flow is intended by references to a virtual connection toward a destination.

When a virtual connection is to be established toward a destination, illustratively from the T-PE 62 as a Source T-PE (ST-PE) toward an AC of the T-PE 78 as a Target T-PE (TT-PE), the ST-PE 62 may request a path computation from the PCE 73. The PCE 73 can itself compute a path from the ST-PE 62 to the S-PE 66. Assuming that each PCE 73, 75, 77 does not have sufficient information for computing a path in other domains, either the PCE 73 or the ST-PE 62 requests a path computation by the PCE 75 for a portion of the virtual connection between the S-PE 66 and the S-PE 74. A path computation for the last portion of the virtual connection is requested from the PCE 77 by the ST-PE 62 or by one of the PCEs 73, 75.

Each PCE returns a path computation response such as a reply message to the component that requested the path computation, i.e., either the ST-PE 62 or another PCE. The PCE 77 returns a path computation response to either the ST-PE 62 or one of the PCEs 73, 75. Where the PCE 75 receives the path computation result from the PCE 77, it may return to the PCE 73 or the ST-PE 62 an overall path computation response for the portion of the virtual connection between the S-PE 66 and the T-PE 78. The PCE 73 may similarly return to the ST-PE 62 a path computation response for only a portion of the virtual connection within its routing domain or the entire virtual connection.

As those skilled in the art will appreciate, a path computation response from a PCE may include information that is indicative of one or more computed paths, where any paths that meet path computation criteria specified in the request could be found. A path computation response may also include other information, such as costs and/or other metrics associated with each computed path. The additional information to be included in a path computation response might also be specified in a path computation request. A failure or other indication is returned in response to a request where no paths meeting the requirements specified in the request are found.

A PCE or other route computation element might not only compute routes, but also determine which of multiple computed routes is optimal. In many implementations, only the optimal route is returned as a route computation result. There are currently no defined mechanisms for a routing apparatus to make an optimal route determination based on information received from one or more route computation elements.

Embodiments of the invention relate to selection of routes for virtual connections such as PWs. In some embodiments, end-to-end cost collected through interaction with one or more PCEs as noted above, or through other mechanisms such as during establishment of a virtual connection along a route, is used to record a cost of a virtual connection being established along a route, to record a cost of an alternate route during an optimization attempt for a virtual connection, and/or to re-optimize a virtual connection to a more optimal route.

More generally, metric information associated with different routes is collected and used by a routing apparatus such as a router in making decision as to which route should be selected for a virtual connection. In this way, route selection decisions are distributed to routers instead of being centralized at route computation elements or other external systems.

These and other aspects of the present invention will be described in further detail below.

Figure 4:
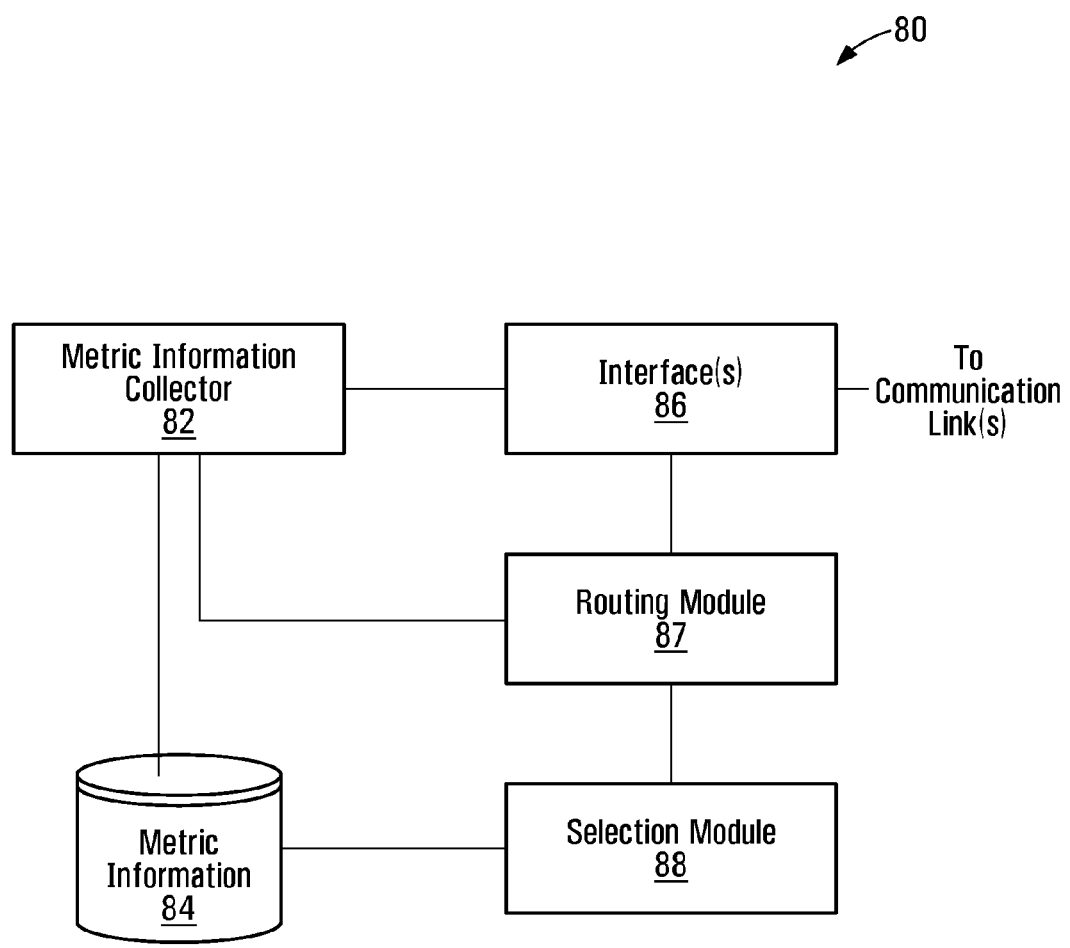
FIG. 4 is a block diagram of a routing apparatus.

FIG. 4 is a block diagram of a routing apparatus. In accordance with one embodiment of the invention, a routing apparatus 80 includes a metric information collector 82, a memory 84 operatively coupled to the metric information collector for storing metric information and/or possibly other information associated with virtual connection routes, one or more one or more interface(s) 86 operatively coupled to the metric information collector, a routing module 87 operatively coupled to the metric information collector and to an interface, and a selection module 88 operatively coupled to the memory and to the routing module.

A communication network routing apparatus may include other components in addition to those shown in FIG. 4. It should be appreciated that only components involved in metric information handling and virtual connection functions have been explicitly shown in the routing apparatus 80. It should also be appreciated that not all of the components shown in FIG. 4 need necessarily be provided in every embodiment of the invention. Thus, the routing apparatus 80 is representative of one illustrative embodiment of the invention. Other embodiments may be implemented using further, fewer, or different components than shown in FIG. 4, with similar or different interconnections.

The types of connections through which the components of FIG. 4 are operatively coupled may, to at least some extent, be implementation-dependent. Communication equipment components often use various types of physical connectors and wired connections such as midplane and backplane conductors, although the present invention is in no way limited to wired connections. In the case of cooperating software functions, for example, an operative coupling may be through variables or registers, and thus be an indirect coupling rather than a direct physical coupling. Components may also be otherwise indirectly physically coupled together through other components.

The interface(s) component 86 represents one or more interfaces, and possibly interfaces of multiple different types, that enable the routing apparatus 80 to communicate with other components of a communication system. For example, the metric information collector 82 and the routing module 87 may interact with other communication system components to perform such functions as collecting metric information for virtual connection routes and establishing virtual connections. Although only a single interface(s) component 86 is shown in FIG. 4, the modules 82, 87 need not necessarily be connected to the same interface or interfaces.

In general, the number and types of interfaces, and also their connection(s) to other components and to other routing apparatus, may vary depending on the communication system and communication equipment in conjunction with which the apparatus 80 is implemented. Those skilled in the art will be familiar with many such interfaces and their operation.

One or more memory devices may be used to implement the memory 84. Solid state memory devices are common in communication equipment, although other types of memory devices, including devices for use with movable or even removable storage media, may also or instead be used. Metric information is shown in FIG. 4 as an example of information that might be stored in the memory 84. It should be appreciated that metric information could be stored in one or more memory devices in the form in which it is collected and/or in a processed form. Other information might also be stored at a routing apparatus such as 80, in the memory 84 or separately. Information indicative of routes for virtual connections between the routing apparatus 80 and various destinations, for example, could be stored as a routing table.

As described in further detail below, the metric information collector 82 and the selection module 88 enable distributed selection of a route, at the routing apparatus 80, for a virtual connection based on metric information associated with multiple different routes for that virtual connection. Metric information may be collected from metric information generated by one or more route computation elements, during actual establishment of virtual connections over different routes, or both. Based on the collected metric information, which may be accessed in the memory 84 or otherwise provided by the metric information collector 82, the selection module 88 can select a particular route for the virtual connection, and the routing module 87 then causes the virtual connection to be established over the selected route, if the connection has not already been established.

At least the metric information collector 82, the routing module 87, and the selection module 88 may be implemented using hardware, firmware, software for execution by one or more processing elements, or some combination thereof. Any or all of devices such as microprocessors, microcontrollers, Programmable Logic Devices (PLDs), Field Programmable Gate Arrays (FPGAs), Application Specific Integrated Circuits (ASICs), Network Processors (NPs), and other types of "intelligent" integrated circuits may be suitable for this purpose.

Given the many possible options for implementing the metric information collector 82 and the modules 87, 88, these components are described herein primarily in terms of their functions. Based on the functional descriptions, a person skilled in the art will be enabled to implement techniques according to embodiments of the invention in any of various ways.

The metric information collector 82 is operable to collect metric information associated with a plurality of different routes for a virtual connection toward a destination. In one embodiment, route metric information is collected from metric information that has been generated by a remote route computation element that is capable of computing routes for virtual connections between the routing apparatus 80 and various destinations, but is not itself part of or co-located with the routing apparatus. More than one route computation element may be involved in this process, for example, where a multi-segment virtual connection spans several routing domains that have respective route computation elements.

Any of various mechanisms may be provided to support metric information collection. In a PCE-based system, for example, the metric information collector 82 may interact directly with a PCE, or possibly with several PCEs, through an interface 86. Suppose that the routing module 87 or another component of the routing apparatus 80 receives a connection request for a virtual connection to a particular destination. The routing module 87 might then send a command or request to the metric information collector 82, which in turn requests from one or more PCEs a path computation for a virtual connection toward the destination.

It should be noted that this process could also involve the selection module 88 as well. For example, the routing module 87 could request a route for the virtual connection toward the destination from the selection module 88, which then, through another command or request for instance, causes the metric information collector 82 to request a path computation for the virtual connection from one or more PCEs through an interface 86. In either of these scenarios, the metric information collector 82 receives metric information for computed paths from the PCE(s) through an interface 86.

Another possible metric information collection mechanism might involve more passive operation by the metric information collector 82. For example, where a separate PCC is provided at the routing apparatus 80, the metric information collector 82 might request, receive, or otherwise obtain metric information that was provided to the PCC by one or more PCEs. In this case, the PCC interacts with the PCE(s), and the metric information collector 82 collects metric information associated with virtual connections without actually communicating with the PCE(s). The metric information collector 82 and the PCC could potentially be configured to implement a request/response scheme according to which the metric information collector requests metric information from the PCC. If the PCC stores metric information received from PCEs in another memory (not shown), then the metric information collector 82 could collect, from the metric information that is received from the PCE(s) and stored by the PCC, metric information that is currently needed for path selection. In some embodiments, the functions of the metric information collector 82 may be integrated within a PCC.

Other mechanisms for collecting metric information from PCEs may also be or become apparent to those skilled in the art.

Using a collection mechanism, or possibly multiple collection mechanisms, the metric information collector 82 collects metric information associated with different candidate routes over which a virtual connection toward a destination can be established. The collected metric information is indicative of one or more route metrics. Cost is one example of a metric for which metric information could be collected in some embodiments. Those skilled in the art will also be familiar with other metrics, illustratively Traffic Engineering (TE) metrics, that might be used to describe, rank, or otherwise differentiate between different possible routes that may be used for a virtual connection. Other examples of metrics include, but are in no way limited to, cumulative delay to reach the destination from the source over a given route or maximum/minimum available bandwidth (bandwidth bottleneck) remaining after establishing the virtual connection over the route. Further metrics to which the presently disclosed techniques could be applied may be or become apparent to those skilled in the art.

The metric information collector 82 may also perform such functions as metric information processing. For example, if the metric information collector 82 or another component such as a PCC of the routing apparatus 80 interacts directly with multiple PCEs when multi-domain routes are to be computed, the metric information collector 82 may combine metric information for multiple path segments to determine a total end-to-end metric for each path. Collected metric information may be stored in the memory 84 in the form in which it is collected and/or in a processed form.

The present invention is in no way dependent upon any particular algorithm used by route computation elements to compute routes or metrics. Many such algorithms will be known to those skilled in the art, and the techniques disclosed herein may also be applicable to new route or path computation algorithms that are subsequently developed.

As noted above, a routing apparatus that interacts with one or more remote route computation elements typically relies on the route computation element(s) to make route optimization decisions. In accordance with an embodiment of the invention, however, the selection module 88 at the routing apparatus 80 is operable to select a route for a virtual connection toward a particular destination based on the metric information collected by the metric information collector 82 for different computed routes for the same virtual connection. The selection module 88 may use a metric comparison function, or a more complex function, to select a particular computed route from multiple computed routes for which metric information has been collected. A comparison function would be suitable for selecting a least cost path, for example. Multiple metrics might be taken into account by the selection module 88, for instance, to implement a weighted combination of cost and delay metrics.

The particular selection function used by the selection module 88 may be predefined or configurable, illustratively through a Command Line Interface (CLI) or other interface of an NMS or other terminal.

It should be noted that this type of distributed route selection capability might be used, for example, to enable a routing apparatus to implement a different optimal route selection mechanism than a PCE, and/or to apply a "margin" to route optimality. A PCE might apply one set of cost criteria in its path computation, for instance, whereas a selection module 88 at a routing apparatus could then apply different criteria to the same cost information to reach a different optimal path selection. In this case, the routing apparatus applies a different route selection mechanism than the PCE. If an attempt is being made to re-optimize an existing virtual connection to a destination, then the selection module 88 might only re-route the virtual connection if a certain margin of improvement would be met. This type of function is typically not supported at least in PCE-based systems.

A route selection made by the selection module 88 may be an initial selection for a virtual connection toward a destination. In this case, the route is selected for a virtual connection for initially establishing communication traffic transfer between the routing apparatus and the destination. The selection module 88 may also or instead select a route for re-optimizing a virtual connection. After a virtual connection has been established at the routing apparatus 80 toward a destination, the metric information collector 82 may collect metric information for alternate routes for the virtual connection. The selection function that was used by the selection module 88 to select the route for the existing virtual connection, or potentially a different selection function, is used to determine whether the existing virtual connection or a virtual connection over an alternate route, should be used for subsequent communications with the destination. This decision may in some embodiments take into account a minimum margin of improvement, as discussed above.

The virtual connection for which a route is selected by the selection module 88 may be a complete virtual connection between the routing apparatus 80 and another routing apparatus at which a destination is reachable, for example. It should be appreciated, however, that the virtual connection may be a segment of a multi-segment virtual connection.

A route computation element such as a PCE may provide information indicative of the different computed routes, in addition to metric information for each computed route. This information may also be stored in the memory 84 or a separate memory area or device. At least selected route information is also provided to or otherwise obtained by the routing module 87. For example, the selection module 88 may provide selected route information to the routing module 87 in some embodiments. A route identifier or other indicator using which the routing module 87 can access stored route information for the selected route in a memory such as 84 may instead be provided to the routing module by the selection module 88.

The routing module 87 is operable to cause a virtual connection to be established over a selected route. This may involve exchanging control signalling with other routing apparatus through T-LDP sessions or other forms of signalling adjacencies, for example. Control signalling may be handled by the routing module 87 itself, or by signalling components or apparatus associated with the routing apparatus 80.

Embodiments of the invention are applicable to other than PCE-based systems. Metric information collection, and possibly other functions such as route computation, need not necessarily involve remote route computation elements. The routing module 87 itself or another component of the routing apparatus 80, for example, may be operable to determine multiple different possible routes for a virtual connection using a routing table for instance. The routing apparatus 80 may similarly have a more active role in metric information collection.

Whether routes are computed locally at a routing apparatus or by remote route computation elements, metric information for different routes can potentially be collected during establishment of virtual connections over those routes. The metric information collector 82 may extract metric information from control signalling exchanged between the routing apparatus 80 and other routing apparatus during connection setup. An example of this type of metric collection mechanism is described below with reference to FIG. 7. The metric information collector 82 may command or otherwise cause the routing module 87 to initiate virtual connections over different routes, and then collect metric information from the resultant control signalling, for example. Although the metric information collector 82 need not necessarily have an active role in the actual exchange of control signalling during virtual connection establishment, it may directly or indirectly monitor the control signalling, such as by passively "listening" for control signalling or participating in the transfer of control signalling, for metric information.

These metric information collection mechanisms, and possibly others, may be applied to optimization of PWs, for example. In this case, the metric information collector 82 collects metric information respectively associated with a plurality of different routes over which PWs for exchanging communication traffic between the routing apparatus 80 and a destination can be established. In an optimization scenario, the different PW routes include a currently selected PW route for a PW that has been established toward the destination, as well as other routes. The selection module 88 selects either the currently selected PW route or another one of the different PW routes for a PW for subsequently exchanging communication traffic with the destination. This selection is based on the metric information respectively associated with the plurality of different PW routes.

If metric information is collected from control signalling that is exchanged during PW establishment, the routing module 87 may be further operable to cause each established PW, having a PW route other than the PW route selected by the selection module 88 for subsequently exchanging communication traffic with the destination, to be released. The routing module 87 may itself release each PW having a non-selected PW route or cooperate with other components such as signalling apparatus to release each such PW.

Figure 5:
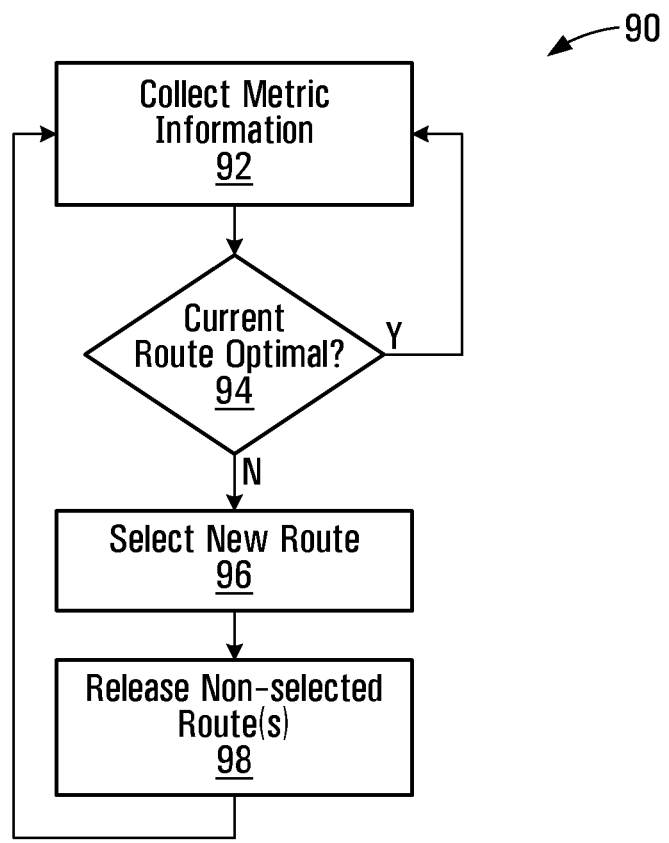
FIG. 5 is a flow diagram of a method according to an embodiment of the invention.

FIG. 5 is a flow diagram of a method according to another embodiment of the invention. The method 90 is performed at a routing apparatus, and involves collecting, at 92, metric information associated with a plurality of different routes for a virtual connection toward a destination. In one embodiment, the metric information is collected from metric information generated by at least one remote route computation element that is capable of computing routes for virtual connections between the routing apparatus and other routing apparatus over an underlying communication system. Metric information may also or instead be collected through other mechanisms, such as from control signalling.

At 94, a determination is made as to whether a current route is optimal. This determination might not be made in all embodiments, since route re-optimization is predicated on an existing virtual connection. A new route, or an initial route in some embodiments, for a virtual connection toward the destination is selected at 96 based on the collected metric information. In the event that a currently selected route is determined to be optimal, or more generally, if it is determined at 94 that no other route is superior to the currently selected route in respect of a route selection function, then the currently selected route remains selected. Metric information collection at 92 may then continue or be repeated at a later time for another re-optimization attempt.

Release of a virtual connection or route at 98 is also specific to particular embodiments of the invention. Virtual connections over non-selected routes would be released at 98, for example, if metric information is collected at 92 during virtual connection establishment, or if the method 90 is used to re-optimize a virtual connection route.

It should be appreciated that the method 90 is illustrative of one embodiment of the invention. Variations of the method 90 are also contemplated. For example, collecting metric information at 92 may involve receiving the metric information from one or more remote route computation elements.

In general, methods according to other embodiments may include further, fewer, or different operations, performed in a similar or different order, than shown in FIG. 5. Examples of such operations, and various ways in which operations may be performed, will be apparent from the foregoing description of FIGS. 1 to 4. Further variations of the method 90 may be or become apparent to those skilled in the art.

Embodiments of the invention have been described above primarily in the context of apparatus and systems. However, aspects of the invention may also involve the use of data structures for instance. FIG. 6 is a block diagram of an example data structure for carrying metric information in control signalling. FIG. 7 is a block diagram of another example data structure for transferring metric information to routing apparatus from a route computation element. A data structure may, in addition to being encoded, modulated, or otherwise incorporated into a signal or other form of physical carrier for distribution, also be stored in a link state database or other data store.

The data structures shown in FIGS. 6 and 7 may be used to specify the cost of a virtual connection in the form of a TE LSP. A COST object as shown in FIG. 6, for example, could be carried within an RSVP message so as to record a TE LSP cost during LSP establishment, and the object as shown in FIG. 7 might be included within a PCEP message so as to provide one or more metrics associated with a computed path to a PCC.

Route or path costs are described in detail below solely for the purposes of illustration. Cost is one example of a metric that may be used in some embodiments of the present invention. Other metrics may also or instead be collected and used in a substantially similar manner. The present invention is in no way limited to cost or any other specific metric.

There are various circumstances in which the Label Switching Router (LSR) at the head end of a TE LSP does not have the ability to determine the total cost of a computed TE LSP. Inter-domain TE LSP computation may use a conventional approach, where each segment is computed by boundary nodes. Consequently, although the head-end LSR can determine the computed path, it cannot determine the total path cost. Another example is when a PCE-based path computation is used to compute TE LSP. In such a case, the head-end LSR (acting as a PCC) may request the PCE to provide the cost of a computed path.

These cases illustrate scenarios in which a new object to be carried within an RSVP message or within a path computation reply message might be particularly useful. Although cost is described herein, these techniques could also be applied to other path or route metrics.

According to one possible implementation, a head-end LSR collects the cost of a TE LSP by including in an RSVP Path message an LSP-ATTRIBUTES object with Attribute Flags TLV having a "Path cost requested" flag set. The TLV is passed transparently towards a tail-end LSR. When the tail-end LSR receives the RSVP Path message, the LSR places in the corresponding RSVP Resv message an RRO Attributes Subobject with a "Path cost" flag set inside the RRO. The cost value inside the COST object is initially set to 0.

Every LSR that the Resv message traverses increments the cost value inside the COST Object with the cost of its downstream link and adds to the RRO an RRO Attributes Subobject with the "Path cost" flag set. The absence of the RRO Attributes Subobject with the "Request path cost" flag set for any hop indicates to the head-end LSR that the accumulated path cost does not represent the total path cost.

The COST object shown in FIG. 6 is thus an optional object carried in RSVP Resv messages to collect the cost of a TE LSP. The object is added by a tail-end LSR that supports path cost accumulation when such an accumulation was requested by the head-end LSR, and is updated by LSRs that support the object and path cost accumulation for a given TE LSP. LSRs that do not understand the object or have elected not to participate in path cost accumulation for this LSP pass this object unchanged in the Resv message they generate.

The example format of the COST object for RSVP, as shown, includes a Length field specifying the length of the object in bytes, a Class-Num field including a class number, a C-Type field, and a Cost object body. The Class-Num field includes a value for ensuring that LSRs that do not recognize the object pass it on transparently. The present invention is not restricted to any specific value for this field. A Class-Num value may be subject to approval by an authority such as the Internet Assigned Numbers Authority or a designated expert, for example.

A C-Type value, which may also be subject to such approval, indicates a type of the COST object.

Cost information is specified in the Cost object body, illustratively as a 32-bit unsigned integer specifying the cost associated with a computed path.

Collection of path costs through RSVP signalling, as described briefly above, may be enabled by a new flag to allow a head-end LSR to request path cost accumulation and to allow LSRs to report to the head-end LSR whether the cost accumulation took place. An Attribute Flags TLV with the "Path cost" flag set may be included by the head-end LSR in the LSP_ATTRIBUTES Object in a Path message to request path cost accumulation. An RRO Attributes Subobject with the "Path cost" flag set is included by every LSR in the RRO in a Resv message to indicate that the LSR performed the path accumulation. The COST object is also included by a tail-end LSR in the Resv message to accumulate TE-LSP path cost.

In terms of processing, the normal rules for processing of LSP_ATTRIBUTES Object and RRO Attributes Subobject may substantially apply to implementations that support path cost accumulation, with the following additional details in some embodiments.

A head-end LSR may include an Attributes TLV with "Path cost" flag set within an LSP-ATTRIBUTES object in an RSVP Path message to request path cost accumulation. Each LSR along a path extracts the path cost from the COST object in a corresponding RSVP Resv message and increments it by its downstream link to obtain the current path cost for the TE LSP. The head-end LSR examines the RRO to determine whether the cost accumulated is of the entire path, based on RRO Attributes Subobjects added by each node along the LSP path.

Intermediate transit LSRs do not modify the "Path cost" flag set within the Attributes TLV within LSP-ATTRIBUTES in a received RSVP Path message but should include in the corresponding RSVP Resv message an RRO Attributes Subobject with the "Path cost" flag set and increment the Cost value in the COST object with the cost of its downstream link, if it supports path cost accumulation. An intermediate LSR does not update the corresponding RSVP Resv message RRO Attributes Subobject with the "Path cost" flag set and passes the COST object unchanged if it does not support path cost accumulation or if it elects not to provide path cost accumulation for this LSP setup.

A tail-end LSR, upon receiving an RSVP Path message including an Attributes TLV with a "Path cost" flag set within the LSP-ATTRIBUTES, should include in the corresponding RSVP Resv message an RRO Attributes Subobject with the "Path cost" flag set and a COST object with a cost value set to 0, if it supports path cost accumulation. Otherwise, the tail-end LSR does not include in the RSVP Resv message an RRO Attributes Subobject with the "Path cost" flag set and does not include a COST object, such as if it does not support path cost accumulation or if it elects not to provide path accumulation for this LSP setup.

When RSVP Fast Reroute is employed along the path, normal general rules for failure processing substantially apply, although an updated Resv Message sent by a Point of Local Repair (PLR) will include the LSP-ATTRIBUTES, COST, and RRO objects of the path being activated and the newly collected cost would need to be updated.

In some cases, it may be desirable for a PCC to know the cost of computed paths returned by a PCE. A mechanism to request such a cost is already defined in the PCEP. To return the cost to the PCC upon successful path computation, the PCE includes in the PCRep message the cost of a computed path, and possibly each of multiple computed paths, using a COST object.

An example of a PCEP COST object is shown in FIG. 7. When carried as part of a PCRep message, the COST object may be preceded by the 32-bit PCEP common object header.

The Object-Class header field and the Object-Type (OT) fields include values that would allow a PCEP object to be identified as a COST object and, like the values of header fields shown in FIG. 6, may be subject to approval. The present invention is not restricted to any particular values.

These and the other header fields are described in detail in the above-referenced PCEP Internet-Draft document. The Reserved (Res) field includes two flag bits, which in current implementations of PCEP are set to 0. The P field includes a 1-bit Processing-Rule flag, which when cleared specifies that an object is optional. A 1-bit Ignore flag in the I field is used to indicate to a PCC whether or not an optional object was processed. The Object Length field includes a value indicating the total object length, including the header, in bytes.

The Cost object body may as above include a 32-bit unsigned integer indicating path cost.

The example PCEP COST object of FIG. 7 is an optional object that may be carried as part of a PCRep message. The format of the <path> element returned as part of a PCRep message may be modified as follows to account for the COST object in one embodiment:

```
<path>::=<RP>
      [<NO-PATH>]
      [<ero-list>]
      [<LSPA>]
      [<BANDWIDTH>]
      [<DELAY>]
      [<XRO>]
      [<IRO>]
      [<COST>]
```

The COST object shown in FIG. 7 may be carried within PCRep messages. As such, elements of PCEP procedure as applicable to optional objects that are part of those messages may substantially apply to the COST object. A PCE should return the total cost of a computed path when requested to do so in a PCReq message. If the PCE decides not to return the cost as requested by a PCC, the Cost value inside the COST object should be set to 0.

Another possible option for collection of metric information in a PCE-based system is also proposed in the above-referenced PCEP Internet-Draft document. As described in detail in that document, a METRIC object may be inserted by a PCE in a PCRep message so as to provide the cost and/or delay for a computed path. An Object-Class, Object-Type, and/or other fields may be used to distinguish an object as a METRIC object and to specify how such an object is to be handled. Three metric types are currently defined, namely IGP metric, TE metric, and Hop Counts, although other types may subsequently be developed.

Based on the examples above, those skilled in the art will be enabled to implement path or route cost collection mechanisms for other protocols than RSVP and PCEP. The above examples further illustrate that any of various implementations may be used even in these protocols. The above-referenced PCEP Internet-Drafts, for instance, describes two types of objects that could potentially be used by PCEs to distributed metric information.

Embodiments of the invention as disclosed herein may allow optimal network utilization end-to-end, which in turn may improve network robustness, and/or decrease bandwidth utilization across a network by minimizing the number of links used to provide end-to-end services.

Network robustness may also be improved by making PW establishment dynamic and less error prone to human configuration errors.

Operating expenditures may thereby be reduced.

What has been described is merely illustrative of the application of principles of embodiments of the invention. Other arrangements and methods can be implemented by those skilled in the art without departing from the scope of the present invention.

For example, although RSVP is discussed in detail herein, similar techniques may apply to other protocols. Other disclosed illustrative examples should similarly be interpreted in a non-limiting manner. A PW is one type of virtual connection that can be established for communication traffic transfer. The techniques disclosed herein, however, may also be applicable to other types of virtual connections.

The divisions of functions shown in the drawings and described above are also intended to be illustrative and non-limiting. Embodiments of the invention may be implemented using further, fewer, or different functional elements than considered above.

In addition, although described primarily in the context of methods and systems, other implementations of the invention are contemplated, as instructions stored on a computer-readable medium, for example.

We claim:

1. A routing apparatus comprising:
a metric information collector configured to collect, from metric information generated by at least one remote route computation element that is capable of computing routes for virtual connections between the routing apparatus and other routing apparatus over an underlying communication system, metric information associated with each of a plurality of different computed routes for a virtual connection with a destination; and
a selection module operatively coupled to the metric information collector and configured to select, from the different computed routes and based on the collected metric information, a route for the virtual connection with the destination, wherein the metric information associated with each of the plurality of different computed routes comprises information indicative of a weighted combination of cost and delay to reach the destination from the routing apparatus over each computed route.

2. The routing apparatus of claim 1, further comprising:
an interface operatively coupled to the metric information collector and configured to enable the routing apparatus to communicate with the at least one remote route computation element, wherein the metric information collector is configured to collect metric information by receiving the metric information from the at least one remote route computation element through the interface.

3. The routing apparatus of claim 2, wherein the metric information collector is further configured to receive through the interface, from any of the at least one remote route computation element, the metric information associated with each of the different computed routes.

4. The routing apparatus of claim 1, wherein each of the at least one remote route computation element comprises a Path Computation Element (PCE) for computing Label Switched Paths (LSPs), and the metric information collector comprises a Path Computation Client (PCC).

5. The routing apparatus of claim 1, wherein the virtual connections comprise PseudoWires.

6. The routing apparatus of claim 1, wherein the selection module is configured to select the route for the virtual connection for initially establishing communication traffic transfer between the routing apparatus and the destination.

7. The routing apparatus of claim 1, wherein the different computed routes comprise a currently selected route of an existing virtual connection that has been established with the destination; and the selection module is configured to re-optimize the currently selected route by selecting, based on the collected metric information, between the currently selected route and another one of the different computed routes for the virtual connection for subsequently exchanging communication traffic with the destination.

8. The routing apparatus of claim 1, wherein at least one of the virtual connections comprises a multi-segment virtual connection having a plurality of segments.

9. A method comprising:
collecting at a routing apparatus, from metric information generated by at least one remote route computation element that is capable of computing routes for virtual connections between the routing apparatus and other routing apparatus over an underlying communication system, metric information associated with each of a plurality of different computed routes for a virtual connection with a destination; and
selecting at the routing apparatus, from the different computed routes and based on the collected metric information, a route for a virtual connection with the destination, wherein the metric information associated with each of the plurality of different computed routes comprises information indicative of a weighted combination of cost and delay to reach the destination from the routing apparatus over each computed route.

10. The method of claim 9, wherein the collecting comprises:
receiving the metric information from the at least one remote route computation element.

11. The method of claim 9, wherein each of the at least one remote route computation element comprises a Path Computation Element (PCE) for computing Label Switched Paths (LSPs), and wherein receiving comprises:
receiving the metric information at a Path Computation Client (PCC) of the routing apparatus.

12. The method of claim 9, wherein the selecting comprises:
selecting the route for the virtual connection for initially establishing communication traffic transfer between the routing apparatus and the destination.

13. The method of claim 9, wherein the different computed routes comprise a currently selected route of an existing virtual connection that has been established with the destination; and the selecting comprises:
re-optimizing the currently selected route by selecting, based on the collected metric information, between the currently selected route and another one of the different computed routes for the virtual connection for subsequently exchanging communication traffic with the destination.

* * * * *